United States Patent [19]
Schiel

[11] 3,935,920
[45] Feb. 3, 1976

[54] GRILLE SYSTEM FOR TILT CAB TRUCK
[75] Inventor: Douglas W. Schiel, Pleasanton, Calif.
[73] Assignee: Paccar Inc., Bellevue, Wash.
[22] Filed: July 17, 1974
[21] Appl. No.: 489,177

[52] U.S. Cl............................ 180/89 A; 180/68 P
[51] Int. Cl.² ........................................ B60R 19/00
[58] Field of Search .... 180/89 A, 68 R, 68 P, 69 R, 180/69 C; 296/28 C

[56] References Cited
UNITED STATES PATENTS
2,699,223   1/1955   Brumbaugh ................... 180/69 R X
3,282,368   11/1966  Pittera ........................... 180/68 P X

*Primary Examiner*—Kenneth H. Betts
*Assistant Examiner*—R. Schrecengost
*Attorney, Agent, or Firm*—Owen, Wickersham & Erickson

[57] ABSTRACT

A grille system for a tilt cab-over-engine truck includes a one-piece, rigid frame grille which extends above and below the cab pivot axis and has a width greater than the radiator tunnel opening. The grille is mounted for automatic swinging movement away from the radiator and front of the cab in a controlled path as the cab is tilted forward so that the grille does not obstruct the tilt path of the cab. The system should be automatic in order to maximize operator efficiency. Guide rods connected to the side of the grille control the path of the swinging movement to prevent the grille from swinging out in a random pattern as the cab is tilted forward, and these guide rods also guide the grille back into position and hold the grille against rubber stops to prevent vibration and bouncing of the grille when the truck is being driven.

7 Claims, 4 Drawing Figures

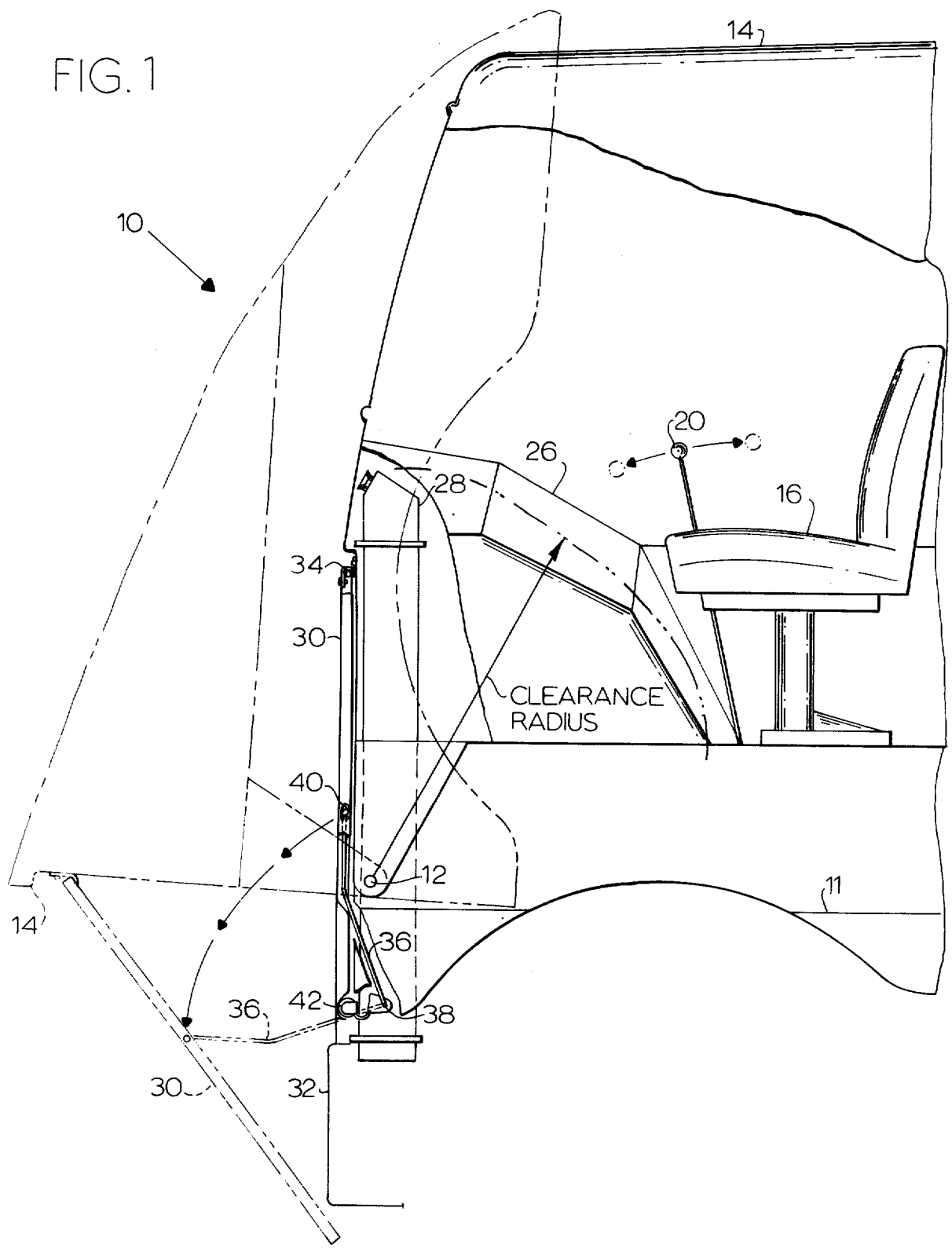

U.S. Patent  February 3, 1976  Sheet 2 of 2  3,935,920
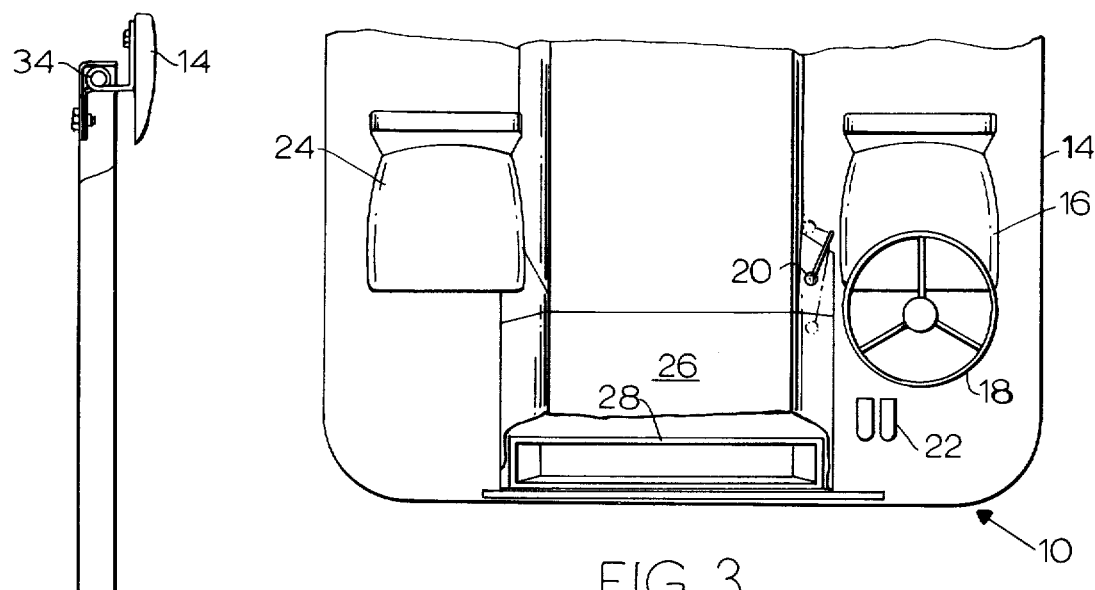
FIG. 3
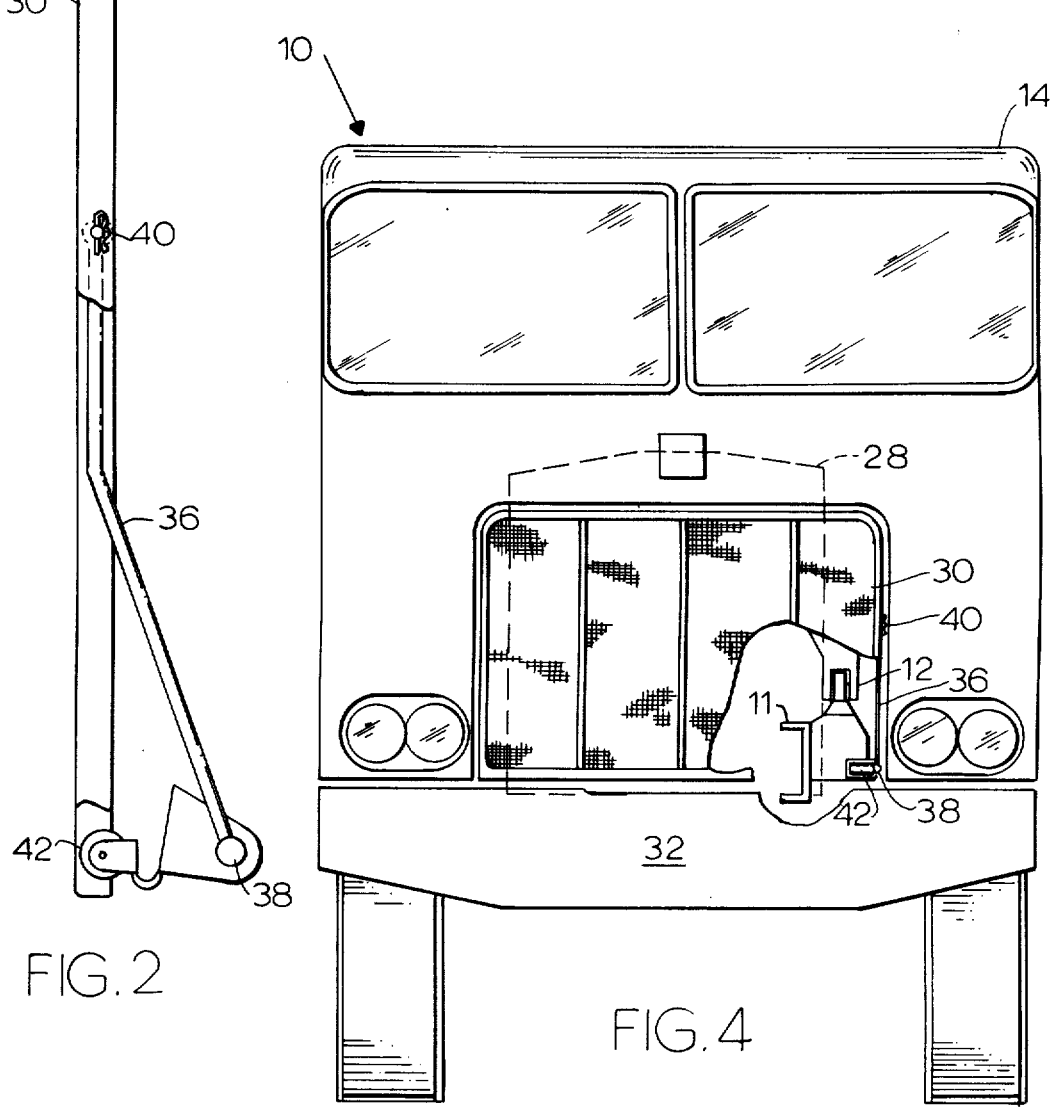
FIG. 2
FIG. 4

GRILLE SYSTEM FOR TILT CAB TRUCK

BACKGROUND OF THE INVENTION

This invention relates to a tilt cab-over-engine (C.O.E.) truck of the kind in which the cab is pivotally connected to the truck chassis for forward tilting about a cab pivot axis to provide access to the engine and radiator area. It relates particularly to a grille system for a tilt cab truck.

In the design of a tilt cab-over-engine truck it is desirable to maintain a minimum cab length and reasonable cab height while offering the maximum driver space possible. A clean appearing vehicle is also an important consideration.

To obtain a minimum cab length it is necessary to locate the cab directly over the engine and radiator with the engine and radiator as far forward under the cab as possible, practically right to the front of the cab. With this style of cab the driver position is above and to one side of the engine and radiator area.

In order to maintain reasonable cab height, the engine and radiator area extends up into the middle of the cab and is normally covered (in the cab up or driving position) by a cab tunnel which runs through the cab and goes over the radiator and engine. Since the cab tilts forward, the cab tunnel needs to be wide enough to clear the radiator. To provide maximum space within the cab for the driver, and possibly a passenger, the width of the cab tunnel needs to be kept to a minimum. With the radiator being wider than the engine, the cab tunnel width can be reduced after it clears the radiator area to provide adequate space to locate the driver and passenger.

The length of the radiator tunnel (the portion of the cab tunnel covering the radiator area) can be reduced and thus the intrusion of the radiator tunnel into the cab seating area and gear shifting area can be minimized by using a relatively high cab pivot. That is, a low cab pivot requires more swing of the cab to go past the radiator (and thus a longer cab tunnel) while a higher cab pivot requires less swing of the cab and therefore permits a shorter radiator tunnel.

When the cab pivot is raised sufficiently high as to permit the desired short length of radiator tunnel, the axis of the cab pivot is located above the bottom of the cab and up behind the grille. When the grille is designed so that the lower edge aligns with the bottom edge of the cab, the lower part of the grille extends down below the cab pivot axis. As a result, when the cab is tilted, the grille either has to move away from the cab or has to be split into two pieces so that the lower part of the grille does not swing back into the radiator.

The cab front also extends down below the pivot axis to minimize the gap above the bumper. The cab front can remain a singular structure without hinging or splitting the areas below the pivot axis, if an opening in the cab front is made wider than the truck chassis and its components. The lower cab front can then tilt rearwardly without interference. This opening should be covered by the grille and therefore establishes the grille width.

SUMMARY OF THE PRESENT INVENTION

It is a primary object of the present invention to construct a grille system for a tilt cab-over-engine truck of the kind described which automatically swings the grille forward in a controlled path away from the cab and radiator as the cab is tilted forward.

In a specific embodiment of the present invention a one-piece, rigid frame grille is connected to the cab by a hinge connection between the grille and the cab at the upper edge of the grille. The lower edge of the grille is held in position by guide rods, and these guide rods also control the swing of the grille about the upper hinge. Two guide rods are used, one at each side of the grille. Each guide rod has one end connected to the grille and an opposite end connected to the truck chassis. When the cab is tilted forward, the guide rods automatically move the grille out away from the front of the cab and prevent the grille from just swinging out in a random pattern and possibly swinging into an object that might be located on the ground and which could cause damage to the grille. When the cab is tilted back to its cab driving position, the rods perform the same function to guide the grille back into position. The guide rods hold the grille tight against rubber stops to keep the grille from vibrating and bouncing when the truck is being driven. The guide rods are located and dimensioned so that they tend to swing the lower end of the grille beyond the vertical and back toward the radiator to a position in which the grille would not lie in plane with the front of the cab in the cab driving position. However, the rubber stops engage the back of the grille to hold the grille in plane with the front of the cab against the force exerted by the guide rods.

Disconnects are provided between the guide rods and the grille for disconnecting the rods so that the grille can be swung open about the upper hinge for access to the radiator area.

Grille system apparatus and methods which incorporate the structure and techniques described above and which are effective to function as described above constitute specific objects of this invention.

Other objects, advantages and features of this invention will become apparent from the following detailed description of preferred embodiments taken with the accompanying drawings.

BRIEF DESCRIPTION OF THE DRAWINGS

FIG. 1 is a fragmentary side elevation view of a tilt cab-over-engine truck having a grille system constructed in accordance with one embodiment of the present invention. FIG. 1 shows in solid outline the locations of the grille system components in the cab driving position and shows in dashed outline the locations of the grille system components when the cab is tilted forward to the cab tilted position; some parts are broken away;

FIG. 2 is an enlarged side elevation view of the grille portion of FIG. 1;

FIG. 3 is a top plan view of the tilt cab-over-engine truck shown in FIG. 1, with some parts broken away to show others; and FIG. 4 is a front elevation view of the tilt cab-over-engine truck shown in FIG. 1, with some parts broken away to show others; the radiator is shown in broken lines.

DESCRIPTION OF A PREFERRED EMBODIMENT

FIGS. 1–4 show a tilt cab-over-engine truck 10 having a grille system constructed in accordance with one embodiment of the present invention. A cab 14 is mounted for pivoting movement relative to the truck frame 11 about a pivot axis 12 between a cab driving position (in which the grille system of the present invention is shown in solid outline) and a cab tilted position (in which the grille system of the present invention is shown in dashed outline). As illustrated in FIGS. 1, 3, and 4, the truck 10 comprises a cab 14, a driver's seat 16, a steering wheel 18, a gear shift lever 20, foot operated controls 22, a passenger seat 24, and a cab tunnel 26.

The cab tunnel 26 extends over the radiator 28 and the engine (not shown) in the cab driving position in FIG. 1; and as the cab is tilted forward to the cab tilted position illustrated in phantom outline in FIG. 1, the cab tunnel 26 is swung up and forward to provide access to the engine and radiator area. In the particular truck shown, the radiator 28 is offset relatively to the centerline of the cab and truck. As illustrated in FIG. 3, a relatively narrow width cab tunnel 26 allows more clearance for the shift lever 20, and also provides more seat room for the passenger. As also illustrated in FIG. 3, this cab tunnel 26 is preferably offset to the passenger side of the vehicle for optimum foot control space for the driver.

FIGS. 1 and 3 illustrate that a relatively short length cab can be obtained, while still providing adequate space for the driver and for the engine, if the intrusion of the wider radiator portion of the cab tunnel 26 into the interior of the cab can be minimized. With a short length of the radiator portion of the cab tunnel 26, the driver and passenger can be located closer to the front, and the overall cab length can be reduced accordingly. The length of the radiator portion of cab tunnel 26 can be kept short if a relatively high location of the cab pivot axis 12 is used. The clearance radius for the cab tunnel must be large enough to let all parts of the cab tunnel 26 clear the top of the radiator 28. The clearance radius (and therefore the overall length of the radiator portion of cab tunnel 26) can be shortened by moving the pivot axis 12 up toward the top of the radiator 28.

Locating the cab pivot axis 12 in this way places the pivot axis up behind the grille 30. The lower part of the grille 30 thus extends downward below the level of the cab pivot axis 12.

This lower part of the grille either has to be moved away from the cab, as the cab is tilted forward, or has to be split from the rest of the grille so that this lower part of the grille does not swing back into the radiator 28 or into the bumper 32.

A rigid frame one-piece grille is preferable over a split grille for both aesthetic and functional reasons.

As best illustrated in FIG. 4, a rigid frame, one-piece grille, located symmetrically on the front of the truck cab, presents a clean appearance. FIG. 4 also illustrates how the grille 30 can be made oversize to cover the offset radiator, cab tunnel 26, and chassis components.

In accordance with the present invention the necessary clearance for the lower part of the grille 30 is provided by connecting the grille 30 to the cab by a hidden hinge connection 34 at the upper edge of the grille 30. This permits the grille to swing out and away from the radiator and bumper 32, by rotation about the axis of the hinge 34, as the cab is tilted forward. This is illustrated in FIG. 1.

Also in the present invention, the path of the swinging movement of the grille 30 about the hinge connection 34 is controlled at all times. Two guide rods 36 control this swinging movement of the grille 30, one guide rod 36 being positioned on each side of the grille 30. As best shown in FIG. 2, the lower end of the guide rod 36 is connected to the truck chassis in a pivot connection 38, and the upper end of the guide rod 36 is connected to a side edge of the grille by a connection 40. The connection 40 is a quick disconnect which permits the rods 36 to be disconnected from the grille so that the grille 30 can be swung open for access to the radiator area with the cab in the driving position.

A pair of rubber stops 42, one on each side, are located behind the grille 30 in a position such that these rubber stops coact with a backwardly directed force exerted by the guide rods 36 to hold the grille in the desired upright position and also to prevent vibration and bouncing of the grille when the truck is being driven.

As illustrated in FIGS. 1 and 2, the guide rods 36 are bent at an angle (to provide a spring load closing force) and are located and dimensioned to swing the lower end of the grille beyond the vertical and back toward the radiator to a position in which the grille would not lie in plane with the front of the cab in the cab driving position. Because these guide rods 36 are slightly bent, the engagement of the grille with the rubber stops 42 is effective to hold the grille in plane with the front of the cab, while the bent guide rods flex (or straighten slightly) to accommodate this limitation on the grille movement which would otherwise be produced by these guide rods.

The present invention thus provides a rigid frame one-piece grille system for a tilt cab-over-engine truck having a pivot axis which is located higher than the lower edge of the grille. The grille is connected to the cab in a way that permits the lower end of the grille to be swung automatically out of the way so that it does not interfere with the forward tilting of the cab. The present invention also integrates the grille with the tilt cab-over-engine truck in a way which accommodates important design objectives of the cab.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A grille system for a tilt cab-over-engine truck of the kind in which the cab is pivotally connected to the truck chassis for forward tilting about a cab pivot axis from a cab driving dposition to a cab tilted position to provide access to the engine and radiator area by raising a cab tunnel which normally covers the top of the engine and radiator area in said cab driving position, said grille system comprising, a one-piece grille connected to the cab so as to be positioned upright in front of the radiator with the lower end of the grille extending downward below the cab pivot axis in the cab driving position, and mounting means for automatically swinging the grille forward in a controlled path away from the cab and radiator as the cab is tilted to the cab tilted position, said mounting means including a hinge connection between the grille and the cab at the upper edge of the grille and rigid guide rod means having one end connected to the grille and an opposite end connected to the truck chassis for controlling the path of travel of the grille in said swinging movement of the grille.

2. The invention defined in claim 1 wherein the guide rod means includes means for swinging the lower end of the grille beyond the vertical and back toward the radiator to a position in which the grille would tilt inwardly from the plane of the front of the cab in the cab driving position, and resilient stop means for engaging the back of said grille to hold the grille in plane with the front of the cab against the force exerted by said guide rod means, thereby preventing unwanted swinging during operation of said truck and reducing vibrational noises.

3. The invention defined in claim 1 including disconnect means between said guide rod means and the grille for disconnecting said guide rod means so that the grille can be swung open about the upper hinge for access to the radiator area.

4. The invention defined in claim 1 wherein the one-piece grille is a rigid frame that exceeds the radiator tunnel width.

5. A grille system for a tilt cab-over-engine truck of the kind in which the cab is pivotally connected to the truck chassis for forward tilting about a cab pivot axis from a cab driving position to a cab tilted position to provide access to the engine and radiator area by raising a cab tunnel which normally covers the top of the engine and radiator area in said cab driving position, said grille system comprising, a one-piece grille connected to the cab so as to be positioned upright in front of the radiator with the lower end of the grille extending downward below the cab pivot axis in the cab driving position, and mounting means for automatically swinging the grille forward in a controlled path away from the cab and radiator as the cab is tilted to the cab tilted position, said mounting means including a hinge connection between the grille and the cab at the upper edge of the grille and guide rod means for controlling the path of travel of the grille in said swinging movement of the grille, said guide rod means including a guide rod at each side of the grille with each guide rod having one end connected to the grille and an opposite end connected to the truck chassis.

6. The invention defined in claim 5 wherein the guide rods are dimensioned and located to swing the lower end of the grille beyond the vertical and back toward the radiator to a position in which the grille would not lie in plane with the front of the cab in the cab driving position and including resilient stop means for engaging the back of the grille to hold the grille in plane with the front of the cab against the force exerted by the guide rods.

7. The invention defined in claim 5 including disconnect means between each guide rod and the grille for disconnecting the rods so that the grille can be swung open about the upper hinge for access to the radiator area.

* * * * *